Aug. 26, 1969  R. PODOLSKY  3,463,209

SCREW FASTENERS

Filed May 12, 1966

United States Patent Office 3,463,209
Patented Aug. 26, 1969

3,463,209
SCREW FASTENERS
Romain Podolsky, 6 Rue Basly, Asnieres 92, France
Filed May 12, 1966, Ser. No. 549,548
Claims priority, application France, May 17, 1965,
17,298
Int. Cl. B25b 15/00
U.S. Cl. 145—50                              11 Claims

ABSTRACT OF THE DISCLOSURE

A screw and screw-driver adapted to be secured together temporarily in longitudinal alignment and with sufficient frictional engagement to resist accidental separation of the screw from the screw-driver. The screw has a socket in which the end of the screw-driver is received. The walls that define the socket extend substantially parallel to the central axis of the screw and a radial shoulder is provided in the socket between the open end of the socket and the bottom of the socket. The bottom aperture of the socket has a similar contour and shape as the portion of the socket above the shoulder, but a smaller transverse cross-sectional area. The end of the screw-driver has substantially the same size and shape as the socket in the screw head and when inserted in the socket, there is an interference fit between the screw socket and the end of the screw-driver. This interference fit resists accidental withdrawal of the end of the screw-driver from the socket and the shoulder in the socket and the lower socket aperture resist axial misalignment of the screw-driver relative to the longitudinal axis of the screw.

---

This invention relates to improvements in wood and metal screws.

Wood and metal screws as at present generally in use are formed either with single slot or cruciform slotted or grooved heads.

To appreciate the true value of the features of this invention, it is necessary briefly to enumerate the faults inherent in cruciform slotted screws and their screw-drivers, universally known and employed in very large numbers in spite of their imperfections and in default of others.

In the cruciform and conical slotted or grooved screw, the screw-driver tends towards the lesser effort and endeavours to slide out of the aperture, that is to say, towards the surface of the head, where the diameter of the aperture is greatest. In effect, observation of a workman in the act of screwing or unscrewing a wood or metal screw, with cruciform grooving, will show that the shaft or holder of the screw-driver—under the manual impetus—makes irregular movements, inclining in all directions and even describing a circle or an ellipse. The result is a breaking of contact of the periphery of the aperture and the end of the tool and finally a disengagement of the screw-driver, which lies only partially in the groove. This necessitates the frequent readjustment of the screw-driver in the screw, with resulting loss of time and wear of the tool and of the grooves of the aperture, which causes numerous discardings of screw and screw-driver.

Accordingly, it is an object of this invention to overcome these defects of conventional screws and screw-drivers and to provide improved means for manipulating screws.

The effort of screwing and unscrewing manually, by the method of the present invention, is very slight and is made without the necessity of pressing on the top of the shaft or holder of the screw-driver, or of the tool of the breast drill. This is also true in the case of screwing or unscrewing by means of a manual, electrical or pneumatic drill. The result is that, in the present case, the maintenance of the screw in the axis of the tool undoubtedly facilitates the insertion of the screw.

The arrangements referred to hereafter, separately and as a whole form a novel, simple, practical and proven method, assuring the stability of the members in question, screw and screw-driver, and permitting rapid screwing and unscrewing without loss of time and without hesitation, as much by hand as by breast drill, or even by machines.

The advantages of the invention will be clear from the following description, with reference to the accompanying drawing of some embodiments of the invention given by way of example, but in no restrictive sense.

It must be considered in the present case that the socket formed in the head of the screw is provided with a number of faces, all parallel to the longitudinal axis of the screw. The different transverse sections of the socket—from the top to the bottom thereof—represent contours and shapes of different dimensions, stepped, and, of necessity, graduated towards the bottom of the socket.

Figure 1:
FIG. 1 is a perspective view of a screw having a socket formed in accordance with this invention.
Figure 2:
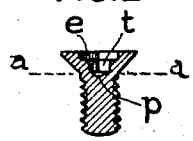
FIG. 2 is a longitudinal cross sectional view of the screw in FIG. 1.
Figure 3:
FIG. 3 is a transverse cross sectional view of the screw of FIG. 1 along the line $a$—$a$ in FIG. 2.
Figure 6:
FIG. 6 is a top plan view of the screw as shown in FIG. 1.
Figure 7:
FIG. 7 is a top plan view of a screw in accordance with this invention wherein the recess at the bottom of the socket is rotated 45° from that in FIG. 6.

Referring to FIG. 2, the screw includes a socket having an inner recess $t$ adjacent the bottom $p$ of the socket. The recess $t$ is defined by four opposed faces as shown in FIGS. 3 and 6. An enlarged portion $e$ of the socket adjacent the top of the socket is separated from the recess $t$ by a radial shoulder. The enlarged portion $e$ is defined by four opposed faces as shown in FIG. 6.

Figure 8:
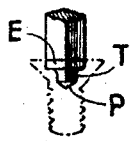
FIG. 8 is a side elevational view of a screw-driver in accordance with this invention and showing the cross sectional view of the screw as in FIG. 2 in phantom lines.
Figure 9:
FIG. 9 is a partial cross sectional view of a screw in accordance with this invention wherein the screw head has a conical face.
Figure 10:
FIG. 10 is a partial cross sectional view of a screw in accordance with this invention having a spherical head.
Figure 11:
FIG. 11 is a partial cross sectional view of a screw in accordance with this invention having a cylindrical head.

Referring to FIG. 8, a screw-driver in accordance with this invention has a projection T having four opposed faces that are parallel to the longitudinal axis of the screw-driver. The projection T terminates in a conical point P at the end of the screw-driver. Adjacent the projection T the screw-driver has a shank portion E of a cross sectional width that is greater than that of the projection T. The shank portion E has four opposed faces that correspond in size and shape to the faces in the enlarged portion *e* of the screw socket. The projection T is connected to the shank E by a small radius fillets to avoid cracking and breaking off the projection T. The arrangement of the shank E, the projection T and the point P is thus sharply defined.

The shoulder or shoulders E and the projection T (FIGURE 8) have straight walls and not conical walls, as is the case of cruciform grooved screws and their screw-drivers known per se. Clearly, the screw-driver corresponding to this novel screw is the exact size and shape of the socket in the screw of this invention.

In order clearly to appreciate the basic idea of the invention, it is sufficient to note that the screw is urged or turned to the right or the left—according to whether screwing or unscrewing is being effected—by inserting only a part of the projection into its space in the aperture *t* and, without any intervention of the shoulder E described above. The latter is, however, necessary for completing the connection between the screw and the screw-driver, to maintain it in the same longitudinal axis and to prevent "play," slight as it may be, between the two members.

The point of the punch projection assists the orientation and penetration in the workpiece, the point at the end of the screw-driver serves to facilitate the orientation of the penetration in the aperture in the head, and contributes to the maintenance of the longitudinal axis of the screw as an exact and interchangeable extension of that of the screw-driver.

It is evident that this necessity is substantiated by examination of the assembly of a cruciform grooved screw, which does not allow of such a result (FIGURE 3). The desired aim is perfectly realised by the present invention, which aim has never been achieved by any known screw.

The above has been mentioned mainly to avoid all confusion between the present invention and the characteristics of a six-sided grooved screw, which has its virtues, but the principles of which are inapplicable to wood and metal screws with heads of different shapes.

It is precisely the shape of the head and the difference existing between the diameter of the latter and that of the threaded shank, which justifies the present method, in which the longitudinal section of the aperture or groove decreases, in stages, to the bottom thereof. It is the same with the screw-driver, which is an exact reproduction of the shape and longitudinal section of the aperture or grooving of the screw. In contradistinction thereto, the cruciform screw is characterised by its conical aperture, the conicity of which introduces the disadvantages, above referred to, which are entirely obviated by the present invention.

Figure 4:
FIG. 4 is a top plan view of a screw having a socket in accordance with this invention wherein the corners of the socket are blunted.
Figure 5:
FIG. 5 is a top plan view of a screw in accordance with this invention wherein the socket has sharp corners.
Figure 12:
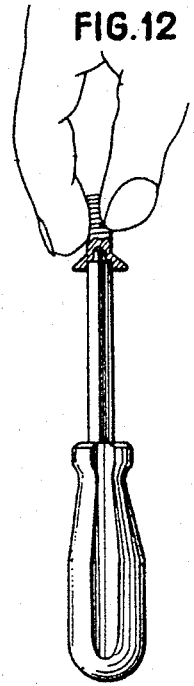
FIG. 12 shows a screw and screw-driver assembly in accordance with this invention wherein the screw is being held vertically to illustrate that the screw and slot engagement have sufficient frictional engagement to resist separation of the screw-driver from the socket.
Figure 13:
FIG. 13 is a perspective view of a wood screw having a socket in accordance with this invention.

The shank or stem of the screw-driver, shown in FIGURE 12, has a transverse section of "ace of diamonds" shape (FIGURES 4 and 5). This stem may, however, be of different section, round, square, hexagonal or other shape.

The advantage of having the transverse section of the screw-driver stem as an "ace of diamonds" consists in that the section conforms exactly to the grooving in the head, into which part of the stem penetrates, to form the shoulder E; if the stem is of another section than "ace of diamonds," the part intended for the shoulder joins the body of the screw-driver by slight rounding, which prevents this part of the screw-driver from cracking.

With the present invention, it must be emphasised that the portion of the stem constituted by the shank E penetrates to a certain depth, into the top of the socket (FIG. 8). This is very important for maintaining unchangeable the longitudinal axis of the screw-driver as an extension of that of the screw.

Also, as regards the screw, an annular washer of thin steel, or of nylon, may be arranged beneath the head.

It should be noted that if the conveyance of a cruciform grooved screw, into a position difficult of access, is very difficult, such procedure is simple, on the other hand, with a screw (FIGURE 12) of the present invention, due to the rigid maintenance of the two members (screw and screw-driver).

This is demonstrated in the following manner (FIGURE 12):

The screw, engaged by the screw-driver, is held between the thumb and index finger, and the screw-driver, with its point held vertically, remains attached to the screw. This demonstration is much appreciated by users, having established that it has never hitherto been possible to carry out, either by the cruciform grooved screw or the screw with single slotted or split head. This permits the user to draw the obvious conclusions.

The shank or stem of the tool, as stated above, may be of any desired section and made of tempered steel, preferably nickel-chrome or vanadium.

The end of the said tool is tempered and the temper drawn in order that the projection and shoulder shall be of sufficient hardness, whilst giving to the steel the necessary ductility, resistant to torsion, during screwing and unscrewing.

What I claim is:

1. A screw having a socket in the head, said screw head socket comprising at least two successive and communicating recesses, each of said recesses being defined by a plurality of socket faces, each of said socket faces extending substantially parallel to the central axis of said screw so that each of said recesses has a substantially constant transverse cross-sectional configuration, the transverse cross-sectional areas of each of said recesses being progressively graduated toward the outermost recess of said socket so as to define a seat at the junction of each of said recesses, and each of said seats entirely bounding the recess therebelow.

2. A screw according to claim 1 wherein the geometric shape of each of said recesses is similar.

3. A screw according to claim 1 wherein each of said recesses is symmetrical about the central axis of said screw.

4. A screw according to claim 1 wherein said socket faces of at least one of said recesses are joined end to end substantially symmetrically around an axis of symmetry extending longitudinally of said screw, each of said faces being curved inwardly toward said axis of symmetry between said ends, said ends being spaced a greater distance from said axis of symmetry than the middle of said faces.

5. A screw according to claim 1 including a conical centering aperture communicating with the innermost one of said recesses.

6. A screw-driver having a shank, said shank comprising at least two successive and communicating driving tangs, each of said driving tangs being defined by a plurality of driving faces, each of said driving faces extending substantially parallel to the central axis of said shank so that each of said driving tangs has a substantially constant transverse cross-sectional configuration, the transverse cross-sectional areas of each of said driving tangs being progressively graduated away from the driving end of said shank so as to define a driving shoulder at the junction of each of said driving tangs, and each of said driving shoulders entirely bounding the driving tang therebelow.

7. A screw-driver according to claim 6 wherein the geometric shape of each of said driving tangs is similar.

8. A screw-driver according to claim 6 wherein each of said driving tangs is symmetrical about the central axis of said shank.

9. A screw-driver according to claim 6 wherein said driving faces of at least one of said driving tangs are joined end to end substantially symmetrically around an axis of symmetry extending longitudinally of said shank, each of said faces being curved inwardly toward said axis of symmetry between said ends, said ends being spaced a greater distance from said axis of symmetry than the middle of said faces.

10. A screw-driver according to claim 6 including a conical centering tip at the driving end of said shank communicating with the driving tang at that end.

11. In combination, a screw having a socket in the head and a screw-driver for engaging said socket, said screw head socket comprising at least two successive and communicating recesses, each of said recesses being defined by a plurality of socket faces, each of said socket faces extending substantially parallel to the central axis of said screw so that each of said recesses has a substantially constant transverse cross-sectional configuration, the tranverse cross-sectional areas of each of said recesses being progressively graduated toward the outermost recess of said socket so as to define a seat at the junction of each of said recesses, and each of said seats entirely bounding the recesses therebelow, said screw-driver having a shank portion contoured to have substantially the same shape and dimensions as said communicating recesses, whereby an interference fit resists separation of said screw-driver from said screw socket.

References Cited

UNITED STATES PATENTS

| 3,175,593 | 3/1965 | Launay | 145—50 |
| 161,390 | 3/1875 | Cummings | 85—45 |
| 1,910,182 | 5/1933 | Robertson | 85—45 |
| 2,338,024 | 12/1943 | Bugg | 145—50 |

FOREIGN PATENTS

| 513,497 | 10/1939 | Great Britain. |
| 485,160 | 7/1952 | Canada. |
| 763,737 | 8/1951 | Germany. |

ROBERT C. RIORDON, Primary Examiner

R. V. PARKER, JR., Assistant Examiner

U.S. Cl. X.R.

81—71